(12) United States Patent
Rush (10) Patent No.: US 9,491,115 B1
(45) Date of Patent: Nov. 8, 2016

(54) PROVIDING SERVICE USING RUN LOCAL DAEMON

(71) Applicant: AMAZON TECHNOLOGIES, INC., Reno, NV (US)

(72) Inventor: Dylan Harris Rush, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 319 days.

(21) Appl. No.: 14/019,326

(22) Filed: Sep. 5, 2013

(51) Int. Cl.
*G06F 15/173* (2006.01)
*H04L 12/911* (2013.01)
*H04L 12/70* (2013.01)
*H04L 12/54* (2013.01)
*G06F 9/50* (2006.01)

(52) U.S. Cl.
CPC ............... *H04L 47/78* (2013.01); *G06F 9/50* (2013.01); *G06F 9/5005* (2013.01); *G06F 9/5077* (2013.01); *H04L 12/5695* (2013.01); *H04L 47/70* (2013.01); *H04L 2012/5631* (2013.01)

(58) Field of Classification Search
CPC ............... H04L 12/5695; H04L 2012/5631; H04L 47/70; H04L 47/78; G06F 9/50; G06F 9/5005; G06F 9/5077
USPC ............. 709/223, 224, 226; 718/1, 100, 104
See application file for complete search history.

(56) References Cited

U.S. PATENT DOCUMENTS

| | | | | |
|---|---|---|---|---|
| 8,250,137 B1* | 8/2012 | Nielsen | ............... | H04L 41/5058 709/203 |
| 8,312,460 B1* | 11/2012 | Blanding | ................ | G06F 9/505 718/104 |
| 8,769,059 B1* | 7/2014 | Chheda | ............... | H04L 41/0866 705/26.5 |
| 2003/0110242 A1* | 6/2003 | Brown | .................... | H04L 29/06 709/222 |
| 2006/0242641 A1* | 10/2006 | Kinsey | .................. | G06F 9/5077 718/1 |
| 2010/0217870 A1* | 8/2010 | Zhou | ................... | H04L 65/1023 709/226 |
| 2011/0022697 A1* | 1/2011 | Huh | ....................... | G06F 9/505 709/224 |
| 2013/0054810 A1* | 2/2013 | Lee | ....................... | H04L 47/805 709/226 |
| 2013/0159376 A1* | 6/2013 | Moore | .................... | H04L 67/10 709/202 |
| 2013/0232271 A1* | 9/2013 | Kim | ....................... | H04L 67/16 709/226 |
| 2014/0215075 A1* | 7/2014 | Lee | ....................... | H04L 47/125 709/226 |
| 2014/0317295 A1* | 10/2014 | Martini | ................... | H04L 47/76 709/226 |
| 2015/0026323 A1* | 1/2015 | Peri | ..................... | H04L 41/5045 709/223 |

* cited by examiner

*Primary Examiner* — Liangche A Wang
*Assistant Examiner* — Johnny Aguiar
(74) *Attorney, Agent, or Firm* — Lindauer Law, PLLC (57) ABSTRACT

A requestor seeks support to perform a particular service using a local daemon. A daemon of a responder provides a resource profile identifying resources to perform the service and information about their use. The resources, such as program code or libraries, are acquired from the responder daemon, or from another source or entity. The local daemon implements the one or more resources in accordance with the resource profile, and performs the particular service. Updated resources may be provided from time to time to the local daemon with respect to the particular service.

20 Claims, 7 Drawing Sheets

PROVIDING SERVICE USING RUN LOCAL DAEMON

BACKGROUND

Users send various requests for services to computing devices on a network. Sometimes, a first service calls upon a second service to perform a function in accordance with the user's request. E-commerce merchants and other network entities seek to reduce latency and improve client satisfaction when performing requested services in such an environment.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Different computing devices coupled to a network or networks may provide different services. A user of a client device may request a particular service or function by accessing a web server or other computing device by way of the Internet or another network pathway. The particular service may be performed and corresponding results or work product may be provided to the requesting user. In turn, a particular computing device on such a network may be configured to perform one or more different services—that is, a first service, a second service, and so on. Additionally, a particular computing device may have resources to function in accordance with one or more operating systems.

As used herein, "resources" may refer to things that may be communicated or exchanged between services (or service entities) in order to enable a particular function or process. Non-limiting examples of resources include program code, service libraries, java archives (JARs), data structures, database access codes, encryption keys, uniform resource locators (URLs), Internet protocol (IP) addresses, and so forth. Other communicable resources may also be used.

Sometimes, a request is received by a first service that is dependent on other services to perform the particular task. The first service may generate a request to a second service that performs the task. The first service or the second service may then provide results to the requesting client device, depending upon the specifics of the request, operating protocols, or other factors. For example, a user of a client device may issue a request to generate a listing of merchandise prices, to be provided as a viewable or storable file. The request may be received by a first service within a computing device network, wherein the first service is configured to provide a landing webpage but is lacking resources to produce the price listing. The first service sends a request to a second service (within the same or another computing device) that generates the price listing and then sends it to the requesting client device.

The ability to send requests between respective services is central to the power and versatility of computing device networks. A virtual "division of labor" is realized such that any number of particular or specialized functions may be performed by respectively configured services. However, various factors influence the speed of processing a given request and the apparent latency experienced by the requesting user. Non-limiting examples of such factors include the present workload of a given service, varying communicational bandwidths between nodes or services within a network, capacity for different operating systems or services to cooperate with each other, and so forth.

A daemon is a computer program that runs as a background process in a multitasking computing device or network of such devices. In one scenario, each service of a plurality of services is performed by a respective daemon, and such daemons may be invoked or "adopted" to operate when needed. Furthermore, respective daemons may communicate data or other information between one another. In this way, daemons may be resourced or configured—essentially, implemented at will—so as to perform respective functions on an as-needed basis.

For example, a first service may receive a user request to compile a listing of customers. However, the first service is not configured to perform the requested service, nor is it desirable to call upon a second service due to a limited network communication speed of that second service. Rather, the first service requests support from the second service so as to enable a daemon to generate the customer listing, wherein the daemon will operate locally with respect to the first service. Such a daemon is referred to as a first run local daemon, or first RLD, for purposes of illustration.

Continuing the present example, the second service communicates the support request or related information to a second RLD that has the particular resources to compile the customer listing. The second RLD responds by providing a "resource profile", as well as one or more resources, to the first RLD. The resource profile or "resource footprint" indicates the resources used to provide the service. The resource profile may also include information about hardware resources. For example, the resource profile may specify an amount of memory to be used, estimate processor usage by the service, identify hardware functions to be accessed, or provide other data indicative of the hardware or other resources used to provide the service.

Information in the resource profile may be normalized or converted to a value which is meaningful across different hardware platforms. In one implementation, the resource profile may include a metric indicative of processor usage by the service. Different computing devices may exhibit different processor usage in performing the same service due to differences in hardware. For example, a first processor type may execute the service in fewer clock cycles than a second processor type due to the hardware differences. As a result, comparison of raw clock cycles may lead to erroneous spawning on a computer device which has insufficient processor resources. By normalizing or converting the metrics, the resource profile may be meaningfully used across different computing devices.

The first RLD issues an acknowledgement of receipt to the second RLD. The first RLD uses the resource profile and the resources to perform the requested service, or to spawn the requested service using the resource profile and the resources. Thus, the first RLD compiles the customer listing and provides it to the requesting user. The first RLD may now retain its present resources and configuration, ready to perform another service. Alternatively, the first RLD may end access to respective data storage, end or close running tasks, or perform other operations so as to "kill" the present configuration or resources and return to an original pre-request state.

In another implementation, the spawned service may be terminated once the present request has been fulfilled. For example, the resource profile may indicate that the implemented (or spawned) service is to be deleted right after use because certain data or aspects thereof are changing with time and may become obsolete. Other post-service operations may also be performed. In another example, the resource profile may include data or information regarding the implementation or use of the resources. In some implementations, should the resources available to the first RLD be insufficient to meet the needs indicated in the resource profile, the first RLD would not perform or spawn the requested service.

In general, and without limitation, the resourcing and invocation of run local daemons in order to provide respective services is contemplated herein. A first service (or requestor) requests support from a second service (or responder) in regard to a particular service. The second service sends information corresponding to the request to a daemon local to the second service, or second RLD. The second RLD provides a resource profile to a first RLD that is local to the first service. The second RLD may also provide one or more of the resources to the first RLD, as well, or such resources may be acquired from another entity.

The first RLD implements the resources and performs the particular service in accordance with the resource profile. A result or work product of the service is then provided to a user client device that initiated the original service call. Updated resources or other revised information may be provided to the first RLD such that the particular service is kept current. Respective variations on the foregoing may also be used in accordance with the methods, devices and systems described herein.

Figure 1:
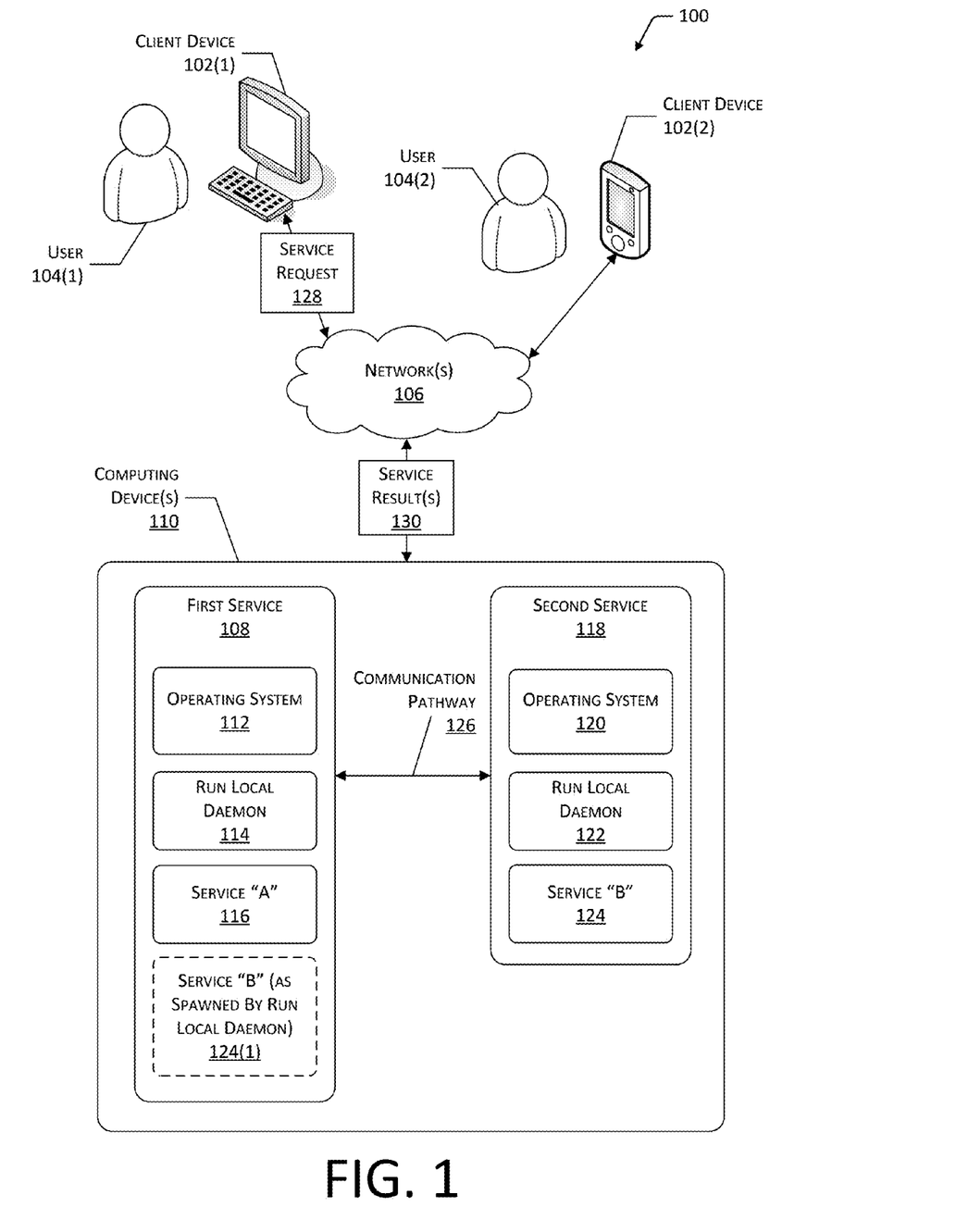
FIG. 1 depcits views of a system in which a first service spawns a second service by operation of a run local daemon.

FIG. 1 depicts views 100 of an illustrative system. The system of the views 100 includes particular elements and operations performed by each. The system of the views 100 is illustrative and non-limiting in nature, and other systems or respective operations are also contemplated.

A client device 102(1) is associated with a user 104(1), while a client device 102(2) is associated with a user 104(2). As depicted, the client device 102(1) is a desktop computer configured to perform business or technical task by way of respective program code (i.e., software), access various websites, present visual or audible content to the user 104(1), and so forth. In turn, the client device 102(2) is depicted as a smart phone having respective resources and configured to perform various operations. The two respective client devices 102 are illustrative and non-limiting, and other systems, numbers of client devices or types, may also be used.

The client devices 102 are respectively configured to communicate data or other information with each other or other computing devices by way of one or more networks 106. The network(s) 106 may include, or be defined by, the Internet or access thereto, a local area network (LAN), a wide-area network (WAN), wireless networks, and so forth.

Also depicted is a first service 108. The first service 108 may be provided by a computing device 110, such as a web server or other apparatus. The first service 108 may include electronic circuitry, program code or instructions stored on computer-accessible media, or other constituency. The first service 108 includes an operating system 112. The first service 108 also includes a run local daemon (RLD) 114 that operates locally from the perspective of the operating system 112.

The first service 108 also includes a service "A" 116 that is configured to perform a particular function or range of functions when invoked (or called) by the operating system 112. For purposes of illustration, the service "A" 116 is always available to the operating system 112 and is thus considered a "permanent" aspect of the first service 108. However, the service "A" 116 may be upgraded or modified from time to time in the interest of error correction, additional or modified functionality, access to evolving data structures or encoding, and so on.

Further depicted is a second service 118. The second service 118 may be provided by the same computing device 110 as the first service 108, or by another computing device 110 or web server. Thus, one or more computing devices 110 may be used. The second service 118 may include electronic circuitry, program code or instructions stored on computer-accessible media, or other constituency. The second service 118 includes an operating system 120. The operating system 120 may be the same as, or different than, the operating system 112.

The second service 118 also includes a run local daemon (RLD) 122 that operates locally from the perspective of the operating system 120. The second service 118 also includes a service "B" 124 that is configured to perform a particular function or range of functions when invoked (or called) by the operating system 120. Thus, the service "B" 124 is available or "on call" to the operating system 120. The service "B" 124 may be upgraded or modified from time to time in the interest of error correction, enhanced functionality, and so on.

The first service 108 and the second service 118, and their respective elements 112-116 and 120-124, are considered distinct domains or environments. Such is the case, whether the first service 108 and the second service 118 are provided by the same computing device 110, or by separate and distinct computing devices 110 without regard for respective geographic locations. The first service 108 and the second service 118 may be considered remote to one another.

In one illustrative and non-limiting implementation, the first service 108 and the second service 118 may communicate independently with the respective client devices 102 by way of the network(s) 106. The first and second services 108 and 118 may also communicate—but not necessarily so—through the network(s) 106 at respectively different bandwidths (e.g., data exchange rates). The first service 108 and the second service 118 may also communicate with each other by way of the network(s) 106, or by one or more pathways 126. In one implementation, the first service 108 and the second service 118 are aspects of a single computing device 110 and exchange data or other signals with one another by one or more internal busses.

The RLD 114 may spawn (or perform) one or more particular services if provided with information regarding the operation and use of the required resource (or resources), and the actual resource(s) or access thereto. As depicted for non-limiting illustration, the first service 108 may invoke and perform the service "B" 124(1) locally if the RLD 114 is provided with the corresponding resource profile and resources.

For example, the user 104(1) may be seeking a list of camera lenses compatible with a particular camera, from an online merchant that deals in such equipment. The user 104(1) accesses a computing device (i.e., web server) 110 associated with the online merchant and issues a service request 128 describing the sought-after list of lenses. The service request 128 is received by the first service 108, which is provided by the computing device 110 accessed by the user 104(1).

Continuing the present example, the operating system 112 parses or otherwise processes the service request 128 and determines that the requested operation is not performed by the service "A" 116, nor by the RLD 114 in its present configuration. The operating system 112 then sends a request for support to the second service 118, seeking resources and information such that the RLD 114 may perform or spawn the needed service "B" 124. In the present example, the second service 118 is also provided by the computing device 110 as accessed by the user 104(1).

The operating system 120 receives the request for support, and sends corresponding information to the RLD 122. In the present example, the RLD 122 and the service "B" 124 function respectively and cooperate with each other so as to generate listings such as that requested by the user 104(1). However, the second service 118 is currently heavily loaded, and thus undesirable latency may be apparent to the user 104(1) if the requested task were presently handled there by.

In the ongoing example, the RLD 122 generates a resource profile and bundles the needed resources, and then provides them to the RLD 114. For instance, the resource profile may list the resources used to perform the service "B" 124, may indicate how they are implemented or cooperate, or provide other salient information. In turn, the resources may include an IP address of a camera equipment database, information as to how to query the database, a formatting template for use in producing the requested listing, and so forth. As depicted, the resource profile and the resources are used to spawn the service "B" 124(1) by way of operations or implementations performed by the RLD 114.

As such, the service "B" 124(1) may be performed locally with respect to the operating system 112. The operating system 112 now provides information germane to the service request 128 to the service "B" 124(1), which generates the desired listing of lenses. The listing of lenses defines work product that is communicated to the client device 102(1) as a service result 130.

The illustrative example described above is one of any number of scenarios wherein a run local daemon is resourced so as to spawn (or perform) a particular service not previously provided within the corresponding domain. As just described, the first service 108 assumed the role of requestor and the second service 118 assumed the role of responder in regard to performing the desired service by way of the RLD 114. In another example, such roles may be reversed, or RLD support may be requested or provided by another service or entity remote to the computing device 110.

Figure 2:
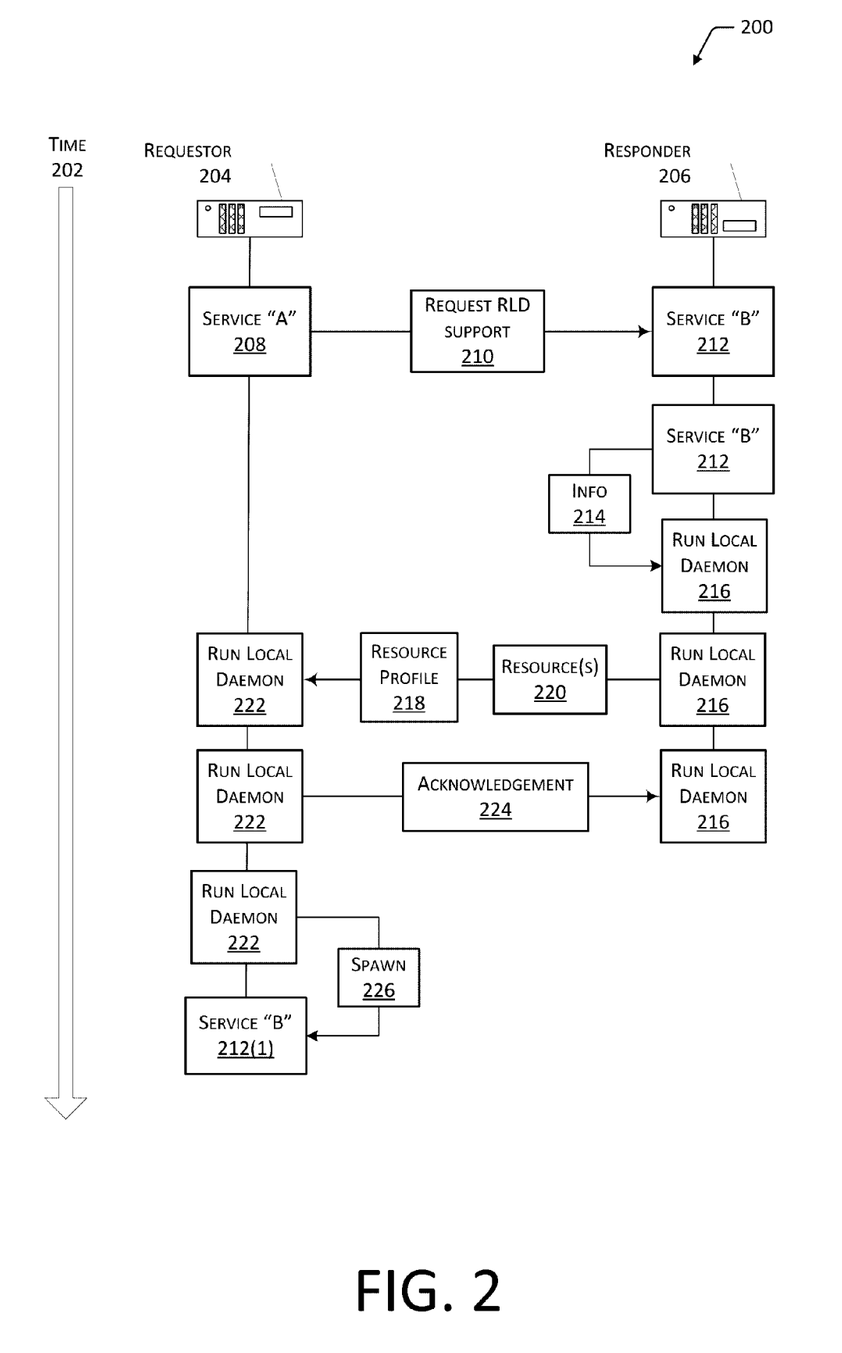
FIG. 2 illustrates a flow diagram including enabling a run local daemon to spawn a service by way of a responding daemon.

FIG. 2 depicts a flow diagram 200 including an exchange of information and resources so as to enable a run local daemon (RLD) to perform a service. In this illustration, time increases down the page as indicated by arrow 202. For purposes of illustration, a requestor 204 and a responder 206 cooperate to enable a particular service to be performed locally by the requestor 204. The requestor 204 and the responder 206 are depicted as distinct computing devices (e.g., web servers) in the interest of clarity. However, the requestor 204 and the responder 206 may be provided as respective aspects as (or domains within) a single computing device (e.g., 110).

Initially, a service "A" 208 sends a request 210 asking for RLD support to a service "B" 212. For instance, a user 104 of a client device 102 has accessed the requestor 204 seeking a table of merchandise pricing correlated to a geographic location—a work product that the service "B" 212 normally provides. Thus, the request 210 indicates that the requestor 204 is seeking to perform the table generation function locally. The service "B" 212 then parses the request 210 and sends corresponding information 214 to a run local daemon 216. The RLD 216 is local to the responder 206 and cooperates with the service "B" 212 during normal operations.

Thereafter, the RLD 216 provides a resource profile 218 and one or more resources 220 to a run local daemon 222. The run local daemon 222 then sends an acknowledgment 224 indicating receipt of the resource profile 218 and the resource(s) 220 to the run local daemon 216. The RLD 222 is local to the requestor 204 and is configured to be called or invoked by the service "A" 208. The RLD 222 issues a spawn 226 so as to implement the one or more resources 220—such as price calculation program code and so forth—in accordance with information included in the resource profile 218.

The requestor 204 is now effectively reconfigured and equipped to perform service "B" 212(1) locally. The service "A" 208, which may be or include an operating system (e.g., 112), may invoke the service "B" 212(1). A service request 128 indicating the sought-after merchandise pricing table is then sent to the service "B" 212(1). The corresponding table of merchandise pricing is generated by the service "B" 212(1), and provided as a service result 130 to the requesting client device 102.

In the foregoing illustration, the responder 206 provides one or more resources 220 as required by the request 210. That is, the responder 206 is able to fully satisfy the request 210 such that the service "B" 212 is provided locally to the requestor 204. Other instances are contemplated in which one or more needed resources must be acquired from sources distinct from the responder that receives the request for RLD support. Such an instance is addressed in the next illustration.

Figure 3:
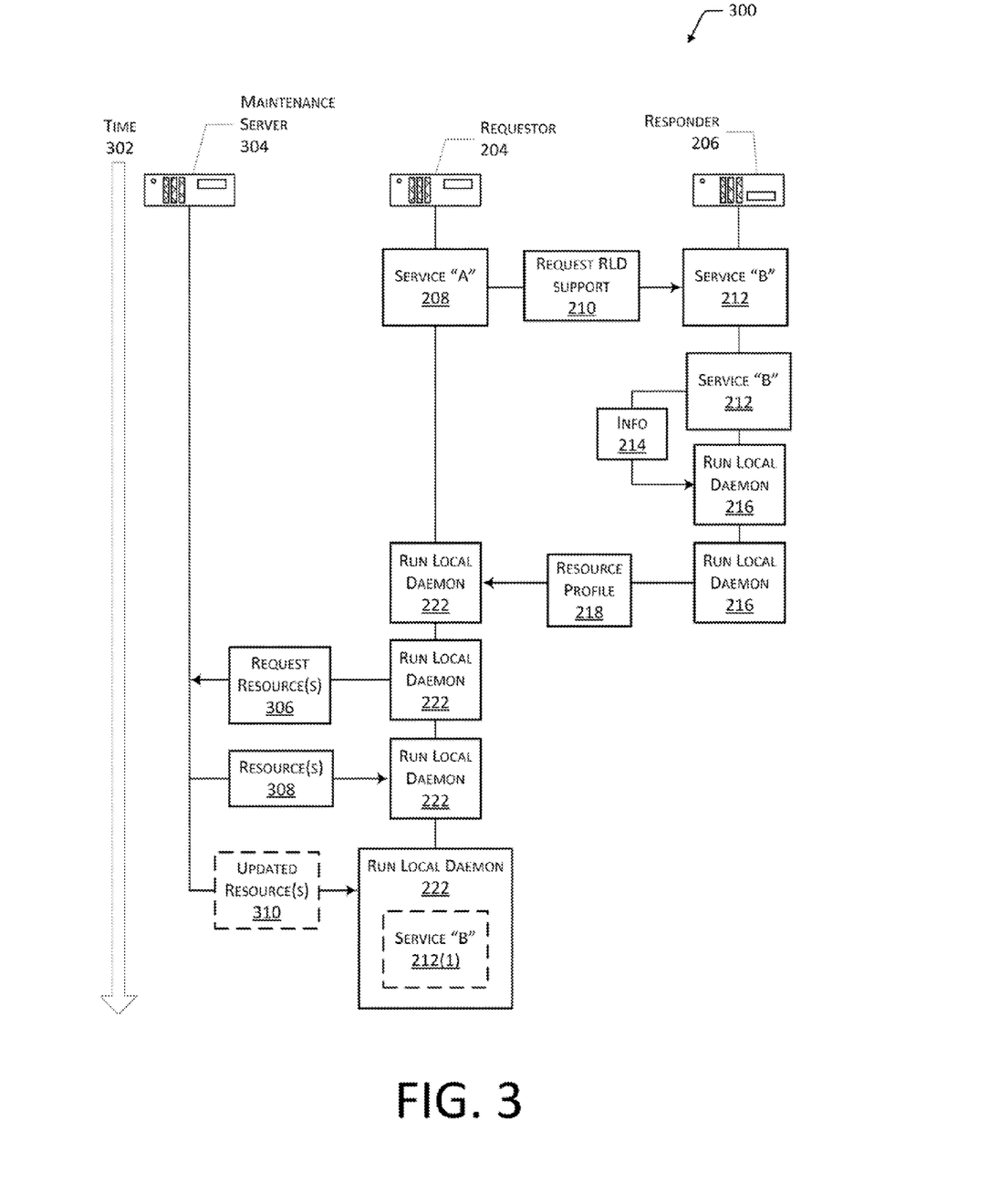
FIG. 3 illustrates a flow diagram including enabling a run local daemon to perform a service by way of a responding daemon and a maintenance server.

FIG. 3 depicts a flow diagram 300 including an exchange of information and resources so as to enable a run local daemon (RLD) to perform a service. In this illustration, time increases down the page as indicated by arrow 302. For purposes of example, the requestor 204 and the responder 206 cooperate toward enabling the RLD 222, wherein resources are acquired from a maintenance server 304.

The requestor 204 and the responder 206 are depicted as distinct computing devices, such as web servers, in the interest of clarity. However, the requestor 204 and the responder 206 may be provided as respective domains within a single computing device 110. The maintenance server 304 is a distinct device with respect to both the requestor 204 and the responder 206.

In one implementation, the maintenance server 304 is a computing device 110 or is analogous thereto, having respective constituency and configuration to support operations of the requestor 204, the responder 206, or both. Such constituency of the maintenance server 304 may include, without limitation: program code directed to performing various functions or services; a module to install updated resources in the requestor 204 or the responder 206; and so forth.

A service "A" 208 sends a request for RLD support 210 to a service "B" 212. The request 210 indicates that the requestor 204 is seeking to perform a service "B" 212 locally, such as the decoding of sensitive customer-related data. The service "B" 212 then sends information 214 germane to the request 210 to the run local daemon 216. The RLD 216 cooperates with the service "B" 212 during data decoding operations.

Thereafter, the RLD 216 provides a resource profile 218 to the run local daemon 222. The resource profile 218 identifies one or more resources needed to perform the service "B" 212 and their respective and cooperative operations. The resource profile 218 may also include data or information used by the RLD 222 to configure itself to perform the service "B" 212. It is noted that the RLD 216 does not provide any of the actual resources in the present example. For instance, the resources may include decoding keys or processes, program code, and so on.

Next, the run local daemon 222 generates a request 306 specifying the sought-after resources 308 and provides the request 306 to the maintenance server 304. The maintenance server 304 responds by accessing the one or more resources 308 and provides them to the RLD 222.

The RLD 222 implements the one or more resources 308 in accordance with information included within the resource profile 218. The RLD 222 is now resourced and configured to perform the service "B" 212(1) locally to the requestor 204. Thus, the customer-related data may now be decoded by the service "B" 212(1), and the corresponding service result 130 may be provided to a requesting client device 102 or other entity.

Additionally, one or more updated resources 310 may be provided from time-to-time from the maintenance server 304 to the run local daemon 222. In this way, the service "B" 212(1) may be kept augmented or modified as needed.

Figure 4:
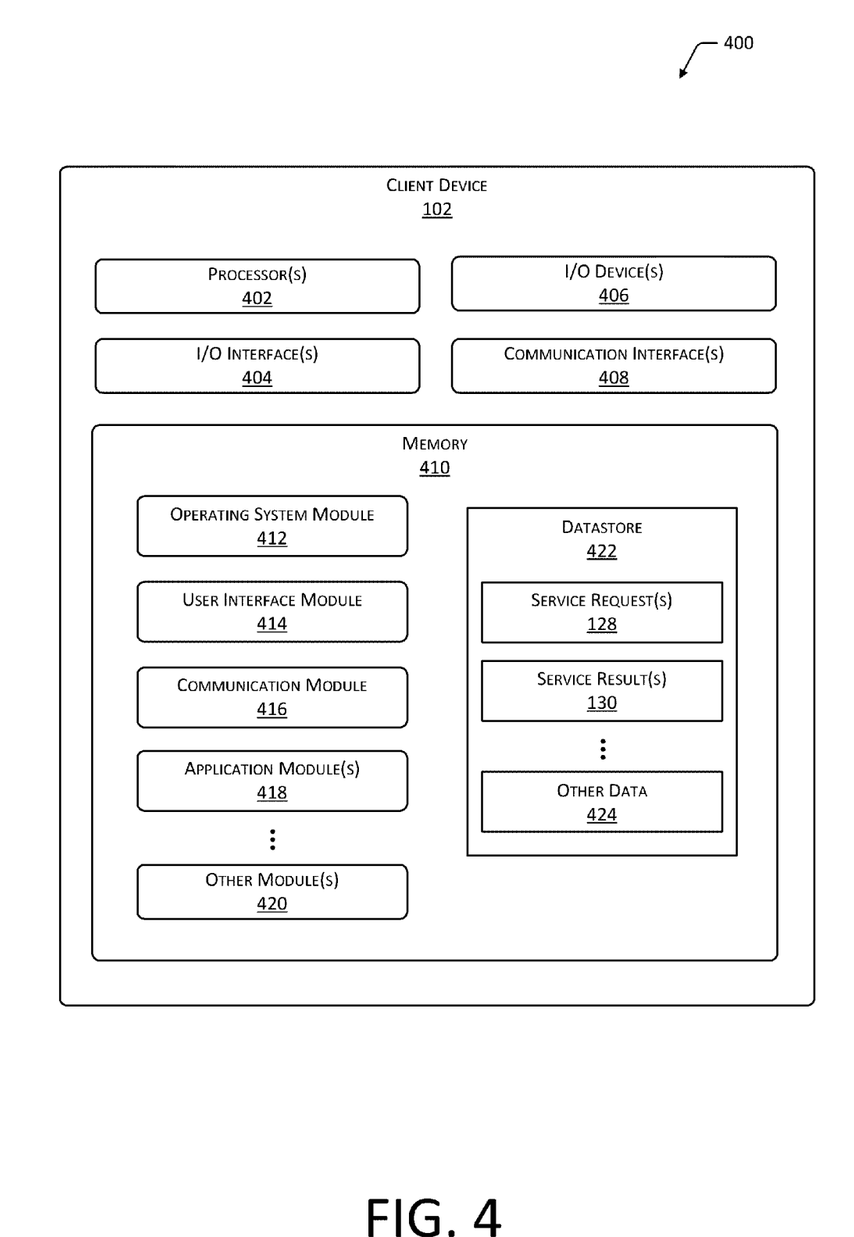
FIG. 4 is a block diagram of a client device and illustrative constituency.

FIG. 4 illustrates a block diagram 400 of a client device 102. The client device 102 may be any of the client devices 102(1) or 102(2), or another suitable apparatus. Other client devices 102 may include analogous or respectively varying constituency or configurations, accordingly. The client device 102 may include one or more processors 402 configured to execute one or more stored instructions. The processor(s) 402 may comprise one or more cores. The client device 102 may include one or more I/O interface(s) 404 to allow the processor(s) 402 or other portions of the client device 102 to communicate with other devices 102, or the computing device(s) 110, and so on. The I/O interfaces 404 may comprise I2C, SPI, USB, RS-232, and so forth.

The I/O interface(s) 404 may couple to one or more I/O devices 406. The I/O devices 406 may include input devices such as one or more of a keyboard, mouse, and so forth. The I/O devices 406 may also include output devices such as a display, audio speakers, haptic output devices, and so forth. In some embodiments, the I/O devices 406 may be physically incorporated with the client device 102, or may be externally placed.

The client device 102 may also include one or more communication interfaces 408. The communication interfaces 408 are configured to provide communications between the client device 102 and other client devices 102, computing devices 110, routers, access points, web servers, and so forth. The communication interfaces 408 may include wireless capabilities, or devices configured to couple to one or more networks including PANs, LANs, WLANs, WANs, and so forth. The client device 102 may also include one or more busses or other internal communications hardware or software that allow for the transfer of data between the various modules and components of the client device 102.

As shown in FIG. 4, the client device 102 includes one or more memories 410. The memory 410 comprises one or more computer-readable storage media (CRSM). The memory 410 provides storage of computer readable instructions, data structures, program modules and other data for the operation of the client device 102.

The memory 410 may include at least one operating system (OS) module 412. The OS module 412 is configured to manage hardware devices such as the I/O interfaces 404, the I/O devices 406, the communication interfaces 408, and provide various services to applications or modules executing on the processors 402. Also stored in the memory 410 may be one or more of the following modules. These modules may be executed as foreground applications, background tasks, daemons, and so forth.

A user interface module 414 may be configured to provide one or more application programming interfaces. The user interface module 414 may also provide data to the client device 102 that is configured to open or retrieve files, enable the rendering of webpages or their contents, or as needed for other operations, such as hypertext markup language ("HTML") files. The user interface module 414 is configured to accept inputs and send outputs using the I/O interfaces 404, the communication interfaces 408, or both.

A communication module 416 is configured to support communication with the client device 102, other devices or entities, computing devices 110, routers, and so forth using the one or more networks 106. In some implementations the communication module 416 may support encrypted communications. For example, hypertext transport protocol secured ("HTTPS") or transport layer security ("TLS") may be supported.

The memory 410 may also include one or more application modules 418. The application modules 418 may be configured or modified, and selectively provided to other computing devices 110, to other client devices 102, and so on. Thus, various devices can be updated or enhanced as new application modules 418 are generated, existing application modules 418 are amended or improved, and so on. The application modules 418 may respectively perform business tasks, technical operations, or other functions in accordance with corresponding program code (i.e., software).

The memory 410 may also include other modules 420 respectively configured to perform other functions of the client device 102. For non-limiting example, the other modules 420 may include one or more respective web browsers enabling access to or presentation of respective webpages provided by computing devices 110, network 106 search functions, and so forth.

The memory 410 may also include a datastore 422 to store data and information. The datastore 422 may use a flat file, database, linked list, tree, executable code, or other data structure to store the information. In some implementations, the datastore 422 or a portion of the datastore 422 may be distributed across one or more other devices including servers, network attached storage devices and so forth.

As depicted, the datastore 422 may store one or more service requests 128 as respectively sent from the client device 102 to one or more computing devices 110. Such service requests 128 may be used in auditing tasks performed by the user 104, quality assurance of the results received, and so on. The datastore 422 may also store one or more service results 130. The stored service results 130 may include any work product, data, information, or file provided by the RLD 114 in response to a corresponding service request 128. Thus, stored service results 130 are available for repeated or future use, provision to other client devices 102, and so forth.

Other data 424 may also be stored in the datastore 422. For example, the other data 424 may include account information, encryption keys, access codes to respective computing devices 110, mapping of the respective services provided by the computing devices 110, and so forth.

Figure 5:
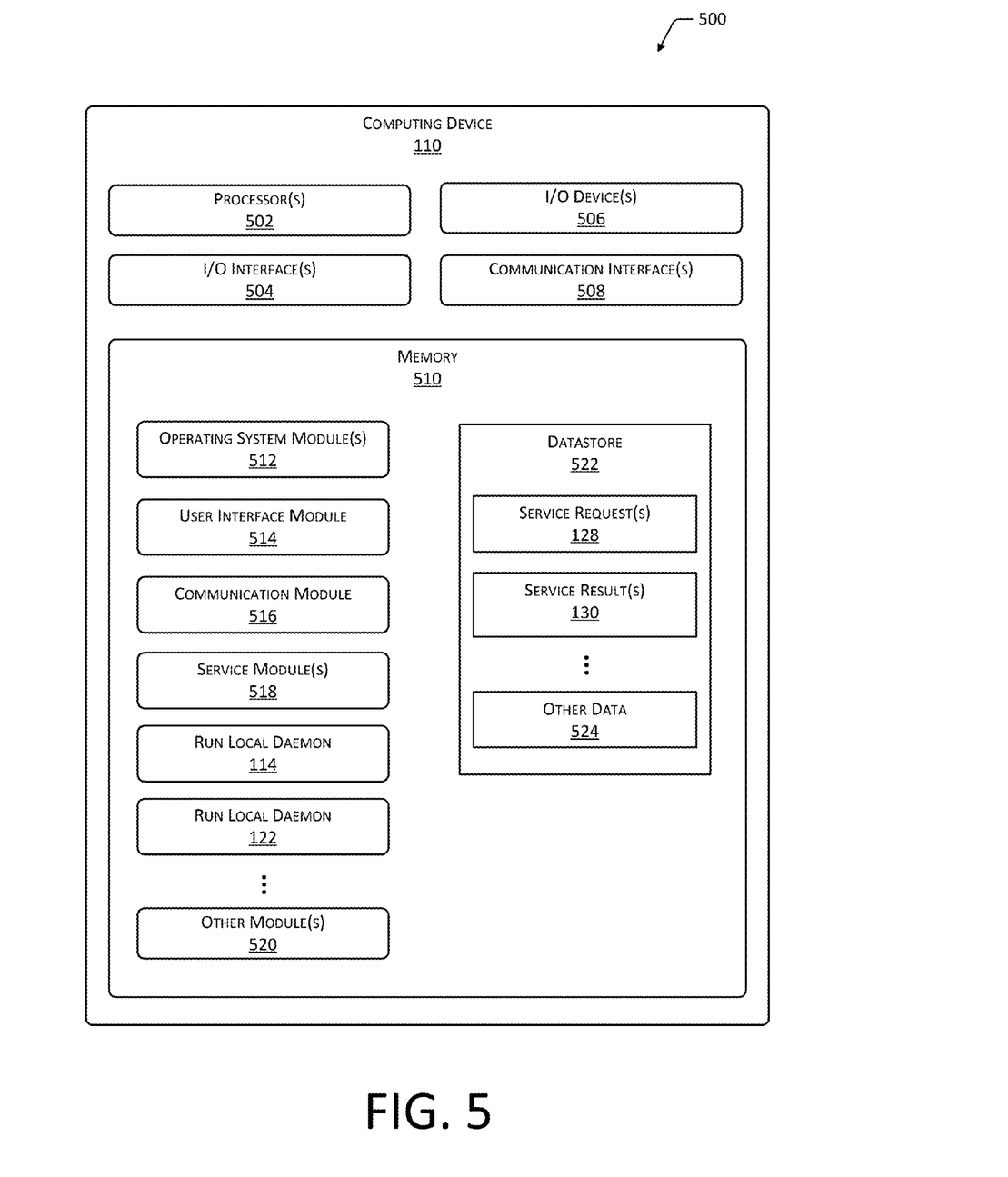
FIG. 5 is a block diagram of a computing device and illustrative constituency.

FIG. 5 illustrates a block diagram 500 of a computing device 110. In one instance, the computing device 110 may be a web server or other apparatus. The computing device 110 is illustrative and non-limiting, and other computing devices of analogous or respectively varying configuration or constituency may also be used. The computing device 110 may include one or more processors 502 configured to execute one or more stored instructions. The processor(s) 502 may comprise one or more cores.

The computing device 110 may include one or more I/O interface(s) 504 to allow the processor(s) 502 or other portions of the computing device 110 to communicate with the user devices 102, or other computing devices 110, the maintenance server 304, and so on. The I/O interfaces 504 may comprise I2C, SPI, USB, RS-232, and so forth.

The I/O interface(s) 504 may couple to one or more I/O devices 506. The I/O devices 506 may include one or more input devices such as a keyboard, mouse, and so forth. The I/O devices 506 may also include output devices such as one or more of a display, audio speakers, haptic output devices, and so forth. In some embodiments, the I/O devices 506 may be physically incorporated with the computing device 110, or they may be externally placed.

The computing device 110 may also include one or more communication interfaces 508. The communication interfaces 508 are configured to provide communications between the computing device 110, the client devices 102, the maintenance server 304, routers, access points, and so forth. The communication interfaces 508 may include wireless functions, devices configured to couple to one or more networks 106 including PANs, LANs, WLANs, WANs, and so forth. The computing device 110 may also include one or more busses or other internal communications hardware or software that allow for the transfer of data between the various modules and components of the computing device 110.

The computing device 110 includes one or more memories 510. The memory 510 comprises one or more CRSM. The memory 510 provides storage of computer readable instructions, data structures, program modules and other data for the operation of the computing device 110. The memory 510 may include at least one operating system module 512. Respective OS modules 512 are configured to manage hardware devices such as the I/O interfaces 504, the I/O devices 506, the communication interfaces 508, and provide various services to applications or modules executing on the processors 502. In one implementation, the OS module(s) 512 include the operating system 112 and the operating system 120.

Also stored in the memory 510 may be one or more of the following modules. These modules may be executed as foreground applications, background tasks, and so forth. A user interface module 514 may be configured to provide one or more application programming interfaces. The user interface module 514 may also generate or provide one or more user input devices or user selection devices to a client device 102. Such user interfaces may be encoded as hypertext markup language ("HTML") files, extensible markup language ("XML") files, or in another suitable format or language. The user interface module 514 is configured to accept inputs and send outputs using the I/O interfaces 504, the communication interfaces 508, or both.

A communication module 516 is configured to support communication with the client devices 102, one or more other computing devices 110 or entities, and so forth using the one or more networks 106. In some implementations, the communication module 516 may support encrypted communications. For example, hypertext transport protocol secured ("HTTPS") or transport layer security ("TLS") may be supported.

The memory 510 may also include one or more service modules 518. The service module(s) 518 may include, or be configured and resourced to perform, the service "A" 116 or the service "B" 124, or both. The service module(s) 518 may also include resources or configuration to perform other services, functions, or operations, as well.

The memory 510 may also include the RLD 114 and the RLD 122 as respectively previously described. Thus, the computing device 110 includes the run local daemons 114 and 122 as associated with the service "A" 116 and the service "B" 124, respectively. The RLD 114 and the RLD 122 may be individually resourced and configured to perform different services or functions, as needed.

Other modules 520 may also be present. For example, a service support module may request or access particular resources on behalf of the RLD 114 or the RLD 122 (or both). Other modules or functionalities may also be implemented.

The memory 510 may also include a datastore 522 to store information. The datastore 522 may use a flat file, database, linked list, tree, executable code, or other data structure to store the information. In some implementations, the datastore 522 or a portion of the datastore 522 may be distributed across one or more other devices including servers, network attached storage devices and so forth.

The datastore 522 may store one or more service requests 128 as received from respective ones of the client devices 102. The datastore 522 may also store one or more service results 130 (or analogous work product) as generated or produced by the RLD 114 or the RLD 122 and provided to corresponding ones of the client devices 102.

The datastore 522 may also store other data 524. For example, the other data 524 may include textual, graphic or audio data to be provided a requesting client device 102, one or more scripts to automate respective functions, and so on. The other data 524 may also include one or more data structures that may be queried, modified, amended, and so forth. Such data structures may be present, for example, if the computing device 110 is implemented as the maintenance server 304.

Figure 6:
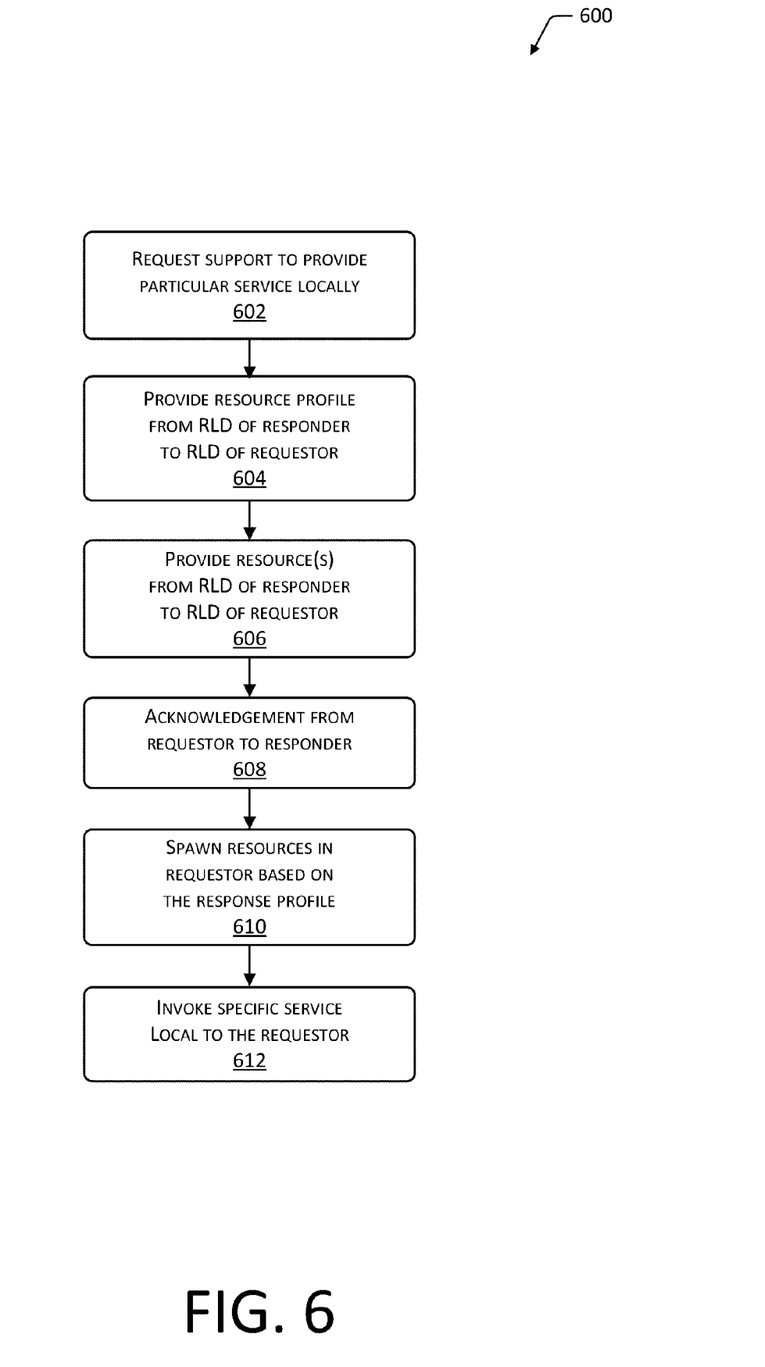
FIG. 6 is a flow diagram of an illustrative process of providing support from a remote daemon so as to enable a run local daemon to spawn a service.

FIG. 6 is a flow diagram 600 illustrating a process including the provision of a resource profile and resources in response to a request for support. In some implementations, this process may be implemented by way of the requestor 204 and the responder 206, each being respective aspects of a computing device 110. The process of the flow diagram 600 is illustrative and non-limiting, and other processes including one or more other steps, omitting one or more of the depicted steps, or proceeding in other orders of execution, may also be used.

Block 602 requests support to provide a particular service locally. For purposes of a present example, the requestor 204 receives a service request 128 from the client device 102(1) specifying the calculation of a table of sales tax values. Service "A" 208 of the requestor 204 is not presently configured to perform the requested calculation. The service "A" 208 sends a support request 210 to the service "B" 212 of the responder 206. The request 210 indicates the nature of the service to be performed.

Block 604 provides a resource profile 218 from a run local daemon 216 of the responder 206 to a run local daemon 222 of the requestor 204. In the present example, the RLD 216 is prompted by the service "B" 212 in regard to the sales tax calculations specified in the service request 128. The RLD 216 responds by providing a resource profile 218 to the run local daemon 222 of the requestor 204. The resource profile 218 may include a listing of required resources, instructions regarding the operation or use of each resource, or other data or information.

Block 606 provides one or more resources 220 from the run local daemon 216 of the responder 206 to the run local daemon 222 of the requestor 204. In the present example, the RLD 216 also provides one or more respective resources 220 to the RLD 222. Such resources 220 may include a sales tax data structure, an arithmetical module or executable program code, or other things as required in accordance with the service request 128.

Block 608 sends and acknowledgement from the requestor to the responder. In the present example, the RLD 222 sends an acknowledgement 224 to the RLD 216, indicating receipt of the resource profile 218 and the one or more respective resources 220.

Block 610 spawns resources 220 in the requestor 204 based on the response profile. In the present example, the RLD 222 spawns (i.e., installs, or configures) the one or more respective resources 220. Such implementation is done according to usage or operations information provided in the resource profile 218. The service "B" 212(1) is now resourced and configured to calculate sales tax values and generate corresponding results locally to the requestor 204.

Block 612 invokes the specific service local to the requestor 204. In the present example, the service "A" 208 invokes the service "B" 212(1) to generate the table of sales tax values in accordance with the service request 128. The service "B" 212(1) operates such that the requested sales tax table is generated as a service result 130. The table of sales tax values may now be provided to the original requesting entity, the client device 102(1).

Figure 7:
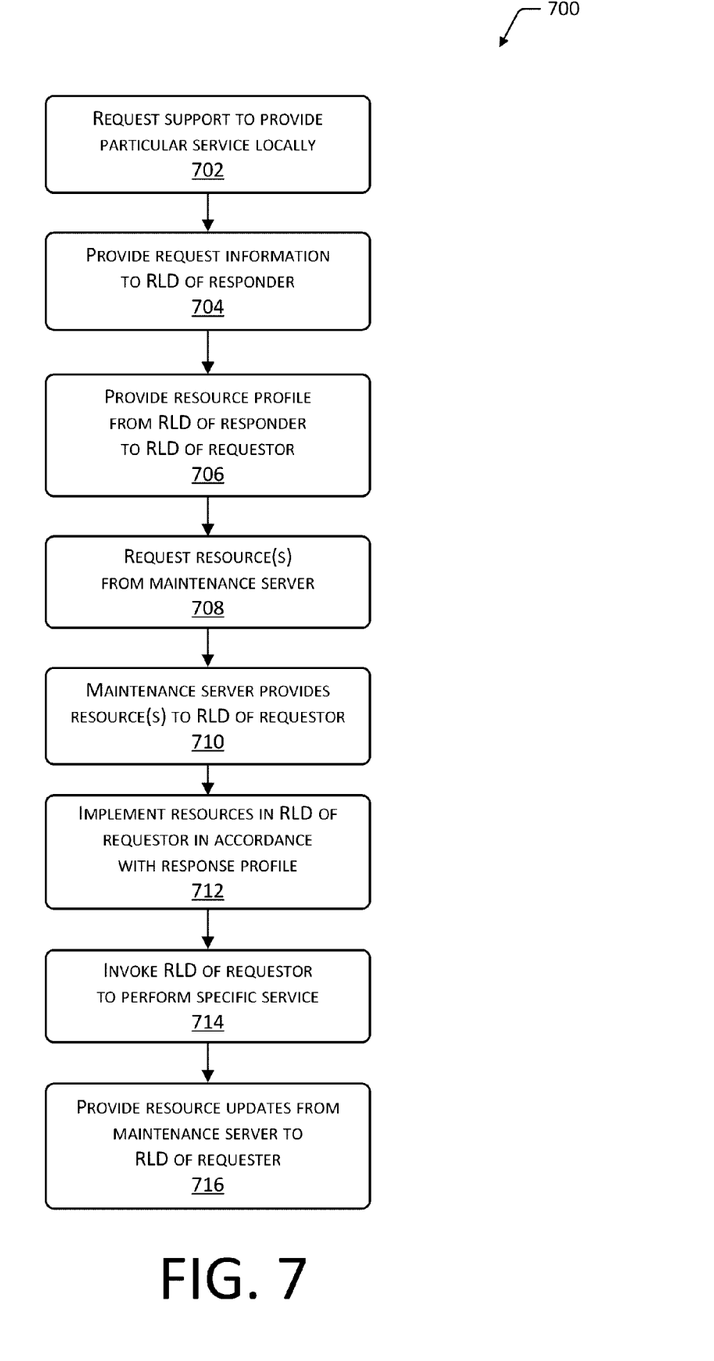
FIG. 7 is a flow diagram of an illustrative process of providing support from a remote daemon and a maintenance server so as to enable a run local daemon to provide a service.

FIG. 7 is a flow diagram 700 illustrating a process including the provision of a resource profile 218 and resources 220 in response to a request for support 210. In some implementations, this process may be implemented by way of the requestor 204, the responder 206 and the maintenance server 304, each being provided by a respective computing device 110. The process of the flow diagram 700 is illustrative and non-limiting, and other processes including one or more other steps, omitting one or more of the depicted steps, or proceeding in other orders of execution, may also be used.

Block 702 requests support to provide a particular service locally. For purposes of a present example, the requestor 204 receives a service request 128 from the client device 102(1) specifying a database query. Service "A" 208 of the requestor 204 is not presently configured to perform the requested query, and sends a corresponding request 210 to the service "B" 212 of the responder 206. The request 210 indicates the nature of the service to be performed.

Block 704 provides request information to a run local daemon of the responder. In the present example, the service "B" 212 of the responder 206 provides information 214 to the RLD 216 describing the service request 128—that is, the database query that the requestor 204 seeks to perform. The RLD 216 parses the information 214 and determines what resources are required and their respective operations accordingly.

Block 706 provides a resource profile from a run local daemon of the responder to a run local daemon of the requestor. In the present example, the RLD 216 provides a resource profile 218 to the RLD 222 of the requestor 204. The resource profile 218 may include a listing of one or more required resources 220, instructions regarding the use of each resource, or other data pertaining to performing the database query.

Block 708 requests one or more resources from a maintenance server. In the present example, the RLD 222 request one or more resources from the maintenance server 304 as identified in the resource profile 218. Thus, the RLD 222 seeks the needed resources 308 from the maintenance server 304, as these were not provided by the RLD 216.

Block 710 provides one or more resources from the maintenance server to the run local daemon of the requestor. In the present example, the maintenance server 304 provides one more resources 308 to the run local daemon 222. Such resources 308 may include a database query template, information such as field names or formatting information, or other data as required in accordance with the service request 128.

Block 712 implements the one or more resources in the run local daemon in accordance with the response profile. In the present example, the RLD 222 implements (installs, or configures itself using) the one or more resources 308. Such implementation is done according to usage or operations information provided in the resource profile 218. The RLD 222 is now resourced and configured to perform the database query as a service "B" 212(1).

Block 714 invokes the run local daemon the requestor to perform the specific service. In the present example, the service "A" 208 invokes the RLD 222 to perform the requested database query. RLD 222 performs service "B" 212(1) such that the database query is performed. In one implementation, the database itself may be a resource of the maintenance server 304. The database may be a resource of another computing device 110 coupled to one of the networks 106. The database query generates a service result 130, which may now be provided to the original requesting client device 102(1).

Block 716 provides resource updates from the maintenance server to the run local daemon of the requestor. In the present example, the maintenance server 304 provides update resources 310 to the RLD 222 from time to time in accordance with various changes or modifications that may be made, to improve service performance, and so on.

Those having ordinary skill in the art will readily recognize that certain components, steps, or operations illustrated in in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium (CRSM) can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising at least one computing device, the at least one computing device configured to:
    provide a request, to a first device, for support for a specific service to be provided locally at the at least one computing device;
    receive, from the first device, at a run local daemon of the at least one computing device, a resource profile indicative of one or more resources used to provide the specific service, the resource profile further indicating one or more of memory, processor, or hardware functions for performing the specific service;
    determine, based on the resource profile from the first device, a metric value indicative of computing capabilities associated with the at least one computing device;
    determine, based on correspondence between the metric value and the computing capabilities of the at least one computing device, that the at least one computing device is sufficient to perform the specific service;
    receive, at the run local daemon, the one or more resources in accordance with the resource profile, individual ones of the resources communicable to the at least one computing device, wherein the one or more resources include one or more of:
        program code;
        a service library;
        a Java archive;
        a data structure;
        a database access code;
        an encryption key;
        a uniform resource locator; or
        an internet protocol address;
    configure, by operation of the run local daemon, the at least one computing device to use the resources to provide the specific service locally; and
    provide the specific service.

2. The system of claim 1, wherein the first device is remote from the at least one computing device, the at least one computing device further configured to:
    determine correspondence between the one or more resources and the resource profile, the correspondence indicating that the one or more resources are sufficient to provide the specific service.

3. The system of claim 1, the at least one computing device further configured to:
    determine the one or more resources based at least in part on the resource profile;
    provide a request for the one or more resources to a maintenance server remote from the at least one computing device;
    receive, at the run local daemon, at least one of the resources from the maintenance server, the maintenance server configured to provide at least one updated resource to the at least one computing device; and
    receive the at least one updated resource from the maintenance server.

4. The system of claim 1, wherein the at least one computing device includes the first device, the run local daemon defining a first run local daemon of the at least one computing device, the at least one computing device further configured to:
    send the request for support for the specific service from a first service of the at least one computing device to a second service of the at least one computing device;
    provide information corresponding to the request from the second service to a second run local daemon of the at least one computing device;
    send the resource profile from the second run local daemon to the first run local daemon; and
    send the one or more resources from the second run local daemon to the first run local daemon.

5. The system of claim 1, further comprising computer-executable instructions to:
    provide, to a maintenance server remote from the first device and the at least one computing device, a second request for the one or more resources indicated in the resource profile; and
    wherein the one or more resources are received from the maintenance server.

6. A method performed at least in part by an apparatus, the method comprising:
    issuing a request for support, the request indicating a service to be performed;
    receiving, at a run local daemon, a resource profile including an indication of a resource used to perform the service and an indication of one or more of memory, processor, or hardware functions for performing the service;
    converting the indication of the one or more of memory, processor, or hardware functions to a metric value associated with computing capabilities of the apparatus;
    determining correspondence between the metric value and the computing capabilities of the apparatus;
    determine, based on the correspondence, that the computing capabilities of the apparatus are sufficient to perform the service;
    acquiring, at the run local daemon, the resource, wherein the resource includes data configured to enable the run local daemon to perform the service locally;
    implementing the resource by operation of the run local daemon; and
    performing the service using the resource.

7. The method of claim 6, wherein the run local daemon is a first run local daemon, and wherein the indication of the resource is received from a second run local daemon, and wherein the implementing the resource includes reconfiguring the first run local daemon to perform the service.

8. The method of claim 6, wherein the run local daemon is a first run local daemon, and wherein the resource is acquired from a second run local daemon.

9. The method of claim 6, wherein the resource is acquired from a maintenance server, and wherein the maintenance server is remote to the run local daemon.

10. The method of claim 6, wherein the run local daemon is a first run local daemon, the method further comprising:
  issuing the request from a first operating system to a second operating system;
  providing data corresponding to the request from the second operating system to a second run local daemon; and
  receiving the indication of the resource from the second run local daemon.

11. The method of claim 10, wherein:
  the first operating system is provided by a first computing device; and
  the second operating system is provided by a second computing device distinct from the first computing device.

12. The method of claim 10, wherein the first operating system and the second operating system are provided by a single computing device.

13. The method of claim 6, wherein the run local daemon spawns the service to implement the resource.

14. The method of claim 6, further comprising:
  receiving, from a maintenance server remote from the apparatus, an updated resource for the service; and
  providing the updated resource to the run local daemon.

15. The method of claim 6, wherein the resource profile is received from a first source and the resource is acquired from a second source remote from the first source.

16. One or more non-transitory computer-readable storage media including one or more instructions, the instructions configured to cause one or more processors to:
  indicate a service to be performed;
  receive, from a first device, a resource profile indicative of resources used to perform the service and one or more of memory, processor, or hardware functions for performing the service, wherein the resources include one or more of: program code or data configured to enable a run local daemon to execute the service locally;
  convert the resource profile from a first value associated with the first device to a metric value associated with computing capabilities of the one or more processors;
  determine correspondence between the metric value and the computing capabilities of the one or more processors;
  determine, based on the correspondence, that the service is executable by the one or more processors;
  acquire, at the run local daemon, the resources from one or more sources; and
  execute, based on action of the run local daemon, the program code to perform the service.

17. The non-transitory computer-readable storage media of claim 16, wherein the run local daemon is a first run local daemon associated with a first operating system, the instructions further configured to cause the one or more processors to:
  indicate the service to be performed to a second operating system different than the first operating system; and
  acquire the resource profile from a second run local daemon associated with the second operating system.

18. The non-transitory computer-readable storage media of claim 16, the run local daemon provided by a first computing device, the instructions further configured to cause the one or more processors to indicate the service to be performed to a second computing device remote to the first computing device.

19. The non-transitory computer-readable storage media of claim 16, the instructions further configured to cause the run local daemon to execute the program code to spawn the service using the resources.

20. The non-transitory computer-readable storage media of claim 16, wherein the one or more sources from which the resources are acquired include one or more second devices remote from the first device.

* * * * *